US006463826B1

(12) United States Patent
Bouchillon

(10) Patent No.: US 6,463,826 B1
(45) **Date of Patent: *Oct. 15, 2002**

(54) AUTOMOBILE TRANSMISSION CABLE DEVICE

(76) Inventor: Randy Bouchillon, 937 Commerce Cir., Hanahan, SC (US) 29406

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/963,416

(22) Filed: Nov. 3, 1997

(51) Int. Cl.[7] .............................. F16C 1/22; F16C 1/26

(52) U.S. Cl. ...................... 74/502.6; 74/502.4; 123/400

(58) Field of Search ............................... 74/513, 502.4, 74/502.6; 123/400; 477/156, 136

(56) References Cited

U.S. PATENT DOCUMENTS 2,823,555 A * 2/1958 Cislo .......................... 477/156
2,870,649 A * 1/1959 Zemke ........................ 477/156
3,034,373 A * 5/1962 Walker ....................... 477/156
3,368,427 A * 2/1968 Johnston, Jr. et al. ...... 477/156
3,498,156 A * 3/1970 McAllister et al. ....... 74/513 X
4,785,691 A * 11/1988 Papenhagen et al. ... 477/156 X

* cited by examiner

*Primary Examiner*—David Fenstermacher
(74) *Attorney, Agent, or Firm*—B. Craig Killough

(57) ABSTRACT

A carburetor to transmission cable linkage for Chrysler Torqueflight® transmissions found on carbureted, rear wheel drive Chrysler cars manufactured since 1962. A throttle lever adapter provided by the invention provides a connection of the cable to the carburetor. The cable is also mounted to the transmission. The opposite end of the cable is mounted to the throttle lever of the carburetor. The throttle lever adapter has a structure which allows it to be universally mounted to, and operable with, Carter, Edelbrock, and Holley carburetors, of various models, as used with Chrysler cars.

4 Claims, 2 Drawing Sheets

AUTOMOBILE TRANSMISSION CABLE DEVICE

FIELD OF THE INVENTION

This invention relates to automotive transmission linkages generally, and is particularly directed to a universal transmission cable linkage device for carbureted rear wheel drive vehicles manufactured by the Chrysler Corporation.

BACKGROUND OF THE INVENTION

Automatic transmissions as used in automobiles have a "kick down" feature. This kick down feature allows the transmission to be shifted to a lower gear when the accelerator pedal is advanced beyond a certain point.

The accelerator cable is attached to the carburetor. The accelerator cable actuates a throttle lever on the carburetor. The throttle lever is connected by means of a linkage to the transmission. When the throttle lever pivots beyond a certain point, the downshifts, or "kicks down" the transmission.

Rear wheel drive vehicles manufactured by the Chrysler corporation since 1962 use a rigid, mechanical linkage to connect the carburetor with the kick down actuator at the transmission. The rigid linkage, having appropriate pivot points therein, extends from the throttle lever of the carburetor to the transmission.

Automatic transmissions on Chrysler cars from 1962 to present have been sold under the Torqueflight® trademark. The Torqueflight® trademark has been used to identify all Chrysler transmissions, regardless of specific model number, and the term "Torqueflight® transmission" identifies these automatic transmissions manufactured by Chrysler. Torqueflight® transmissions have been used in conjunction with six cylinder and eight cylinder engines of various displacements, and with various carburetor setups. Carburetors used with Chrysler engines include two barrel and four barrel carburetors manufactured by Carter, Edelbrock and Holley. Multiple four barrel and multiple two barrel setups, such as 2×4 and 3×2 barrel, have been used with various Chrysler engines.

Because of the wide variety of engine configurations, engine displacements, carburetor models and carburetor setups, Chrysler produced multiple models of linkages, each having different structures and configurations, including different links, pivot points, and brackets. Finding the proper replacement throttle linkage for a particular engine, carburetor and transmission setup has become increasingly difficult. Chrysler no longer manufactures the linkages for many of the models or setups, and they are not available on an aftermarket basis. The owner of a Chrysler car may find that the proper linkage is simply unavailable, even after substantial searching through salvage yards. Given the substantial popularity of many older Chrysler cars, including, in particular, the "muscle cars" of the 60's and 70's, a need for an alternative exists.

Newer cars, including front wheel drive Chrysler cars, use cables, rather than rigid linkages, to perform the kick down function. However, Chrysler has not made a retrofit cable available, and retrofit cables have not been available which will overcome the problem of trying to find an appropriate mounting which will work with the various engine transmission and carburetor setups.

SUMMARY OF THE PRESENT INVENTION

The present invention is a carburetor to transmission cable linkage for Chrysler Torqueflight® transmissions found in carbureted, rear wheel drive Chrysler cars manufactured since 1962. A throttle lever adapter provided by the invention connects the cable to the carburetor. The structure of the throttle leveler adapter of the present invention allows the device to be universally used with all rear wheel drive Chrysler vehicles manufactured since 1962. The invention may be retrofit so as to replace the original equipment throttle pressure linkage, along with its multiple pivots and brackets. The device may be used with six cylinder and eight cylinder Chrysler engines, and with Carter, Holly and Edelbrock carburetors, both two barrel and four barrel, including, multiple carburetor setups.

The cable of the present invention is mounted to the transmission at one end. The opposite end of the cable is mounted to the throttle lever of the carburetor. The throttle lever adapter of the invention has a particular structure which allows it to be mounted to, and operable with, Carter, Edelbrock, and Holley carburetors. The throttle lever adapter is mounted to the throttle lever of the carburetor, and the accelerator cable is mounted to the throttle lever adapter, as it the transmission cable. The cruise control linkage, if applicable, is also mounted to the throttle lever adapter.

The use of a cable eliminates the various structures used by Chrysler for its various engine, carburetor and transmission set ups. The cable does not have multiple links, pivot points and brackets, and the problems associated with maintenance of, and with replacement of, the stock throttle pressure linkages.

DESCRIPTION OF THE PREFERRED EMBODIMENT

Figure 1:
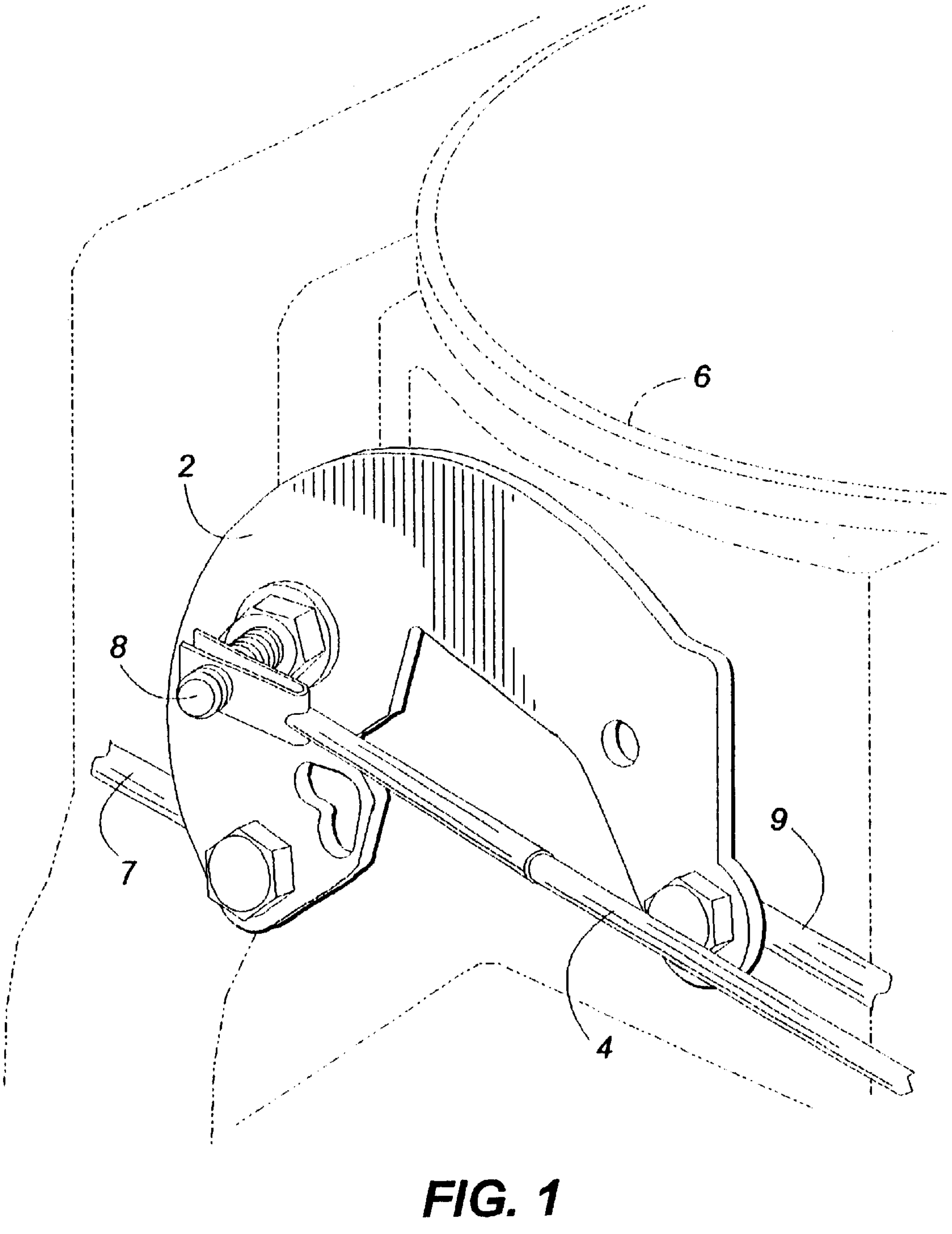
FIG. 1 is a perspective view of the throttle lever mounted to a carburetor, which is shown as a phantom.

Referring now to the drawing figures, FIG. 1 shows the throttle lever adapter 2 as it is attached to the throttle lever of the carburetor. The accelerator cable 4 is attached to the throttle lever, and as the throttle lever is actuated, the throttle lever pivots so as to actuate the carburetor 6.

The throttle lever adapter mounts to the throttle lever at the mounting point of the accelerator cable. As shown in FIG. 1, the accelerator cable is mounted to the stud 8 which extends from the throttle lever. The throttle lever adapter is also mounted to the stud.

The transmission kick down cable 9 is mounted by means of a fastener to the throttle lever adapter. The transmission cable is a cable of the type known in the prior art for various uses. The throttle cable has a housing with an inner member, such as a wire or cable, which traverses within the outer housing.

As the accelerator cable travels, the throttle lever is caused to move to control the carburetor. The throttle lever adapter is attached to, and follows the movement of, the throttle lever. Movement of the throttle lever adapter causes, in turn, the transmission cable to be pulled, and if movement is sufficient, the transmission cable will travel beyond a point which actuates the kick down feature of the transmission.

A cruise control cable 7 may be mounted on an end of the throttle lever adapter which is opposite of the mounting point of the transmission cable. When the cruise control is operable, the cruise control actuates the movement of the throttle lever, and therefore, the throttle lever adapter. In the same manner, movement of the throttle lever adapter moves the transmission cable, and if movement is sufficient, the transmission will kick down.

Figure 2:
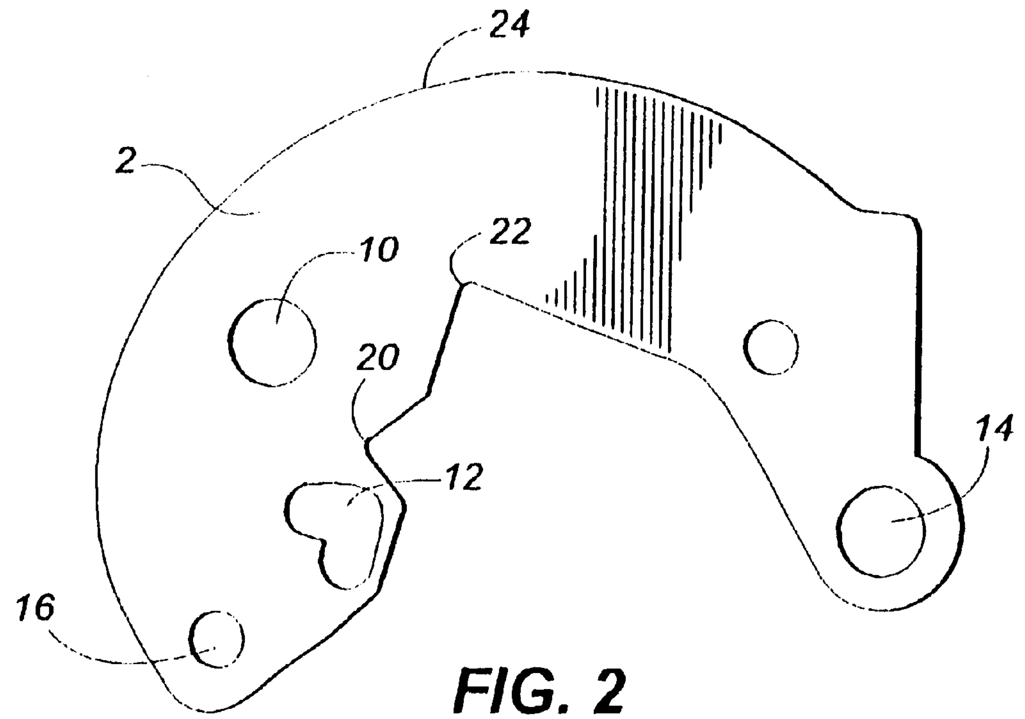
FIG. 2 is a side elevation of the throttle lever adapter

The configuration of the device allows it to be mounted to Carter, Edelbrock or Holley carburetors. Referring now to FIG. 2, each of the surfaces and voids which are present on the throttle lever adapter are employed to allow the universal fit of the device as described herein.

Void 10 is used for mounting the throttle lever adapter to the throttle lever of the carburetor. Stud 8 which extends from the throttle lever is accepted by void 10, and the throttle lever adapter is thereby securely mounted to the throttle lever. The throttle lever pivots, and the throttle lever adapter should not rotate or pivot about the mounting point of void 10.

To secure the throttle lever adapter to the throttle lever, and to keep the throttle lever adapter from rotating or pivoting relative to the throttle lever adapter, a heart shaped secondary mounting point is provided. This heart-shaped secondary mounting point 12 is shaped and formed so that it may be mounted on the various brands of carburetors listed herein, and on the various models thereof. A fastener, such as a screw, or nut and bolt, may be used to mount the device through heart-shaped void 12, with the shape allowing the throttle lever adapter to be positioned for universal acceptance by the throttle levers of the various carburetors.

Void 14 is for mounting of the transmission kick down cable. This cable is mounted so as to allow the end of the transmission cable to pivot relative to the throttle lever adapter.

Void 16 is for mounting the cruise control cable. The cable from the cruise control is mounted so as to let the cable pivot relative to the throttle lever adapter.

Certain Chrysler cars employed three-two barrel carburetors known by Chrysler as a “six-pack”. Notch 20 allows for clearance on the three-two barrel setup. Notch 22 allows for Holley two-barrel clearance.

The upper arcuate surface 24 allows for clearance of obstructions while maintaining sufficient structural integrity to allow the voids and notches to be present in the structure of the device the upper arcuate a mammillated surface 24 extends from near the lower end of the generally vertical portion of the throttle lever adapter to near the end of the arm which extends aftwardly from the generally vertical portion of the throttle lever adapter. The upper arcuate surface is mostly constant, and in the preferred embodiment has a diameter from about 2¾ to 3 inches, with a diameter which is usually 2⅞ inches. This arcuate surface clears obstructions on the various carburetor set ups for Chrysler cars manufactured since 1962.

The direct distance from void 10 to void 14 is preferred to be 2³⁄₁₆", but could be in the range of 1¾" to 3". A distance of about 2⅛" to 2¼' will provide the desired universal use of the device.

Figure 3:
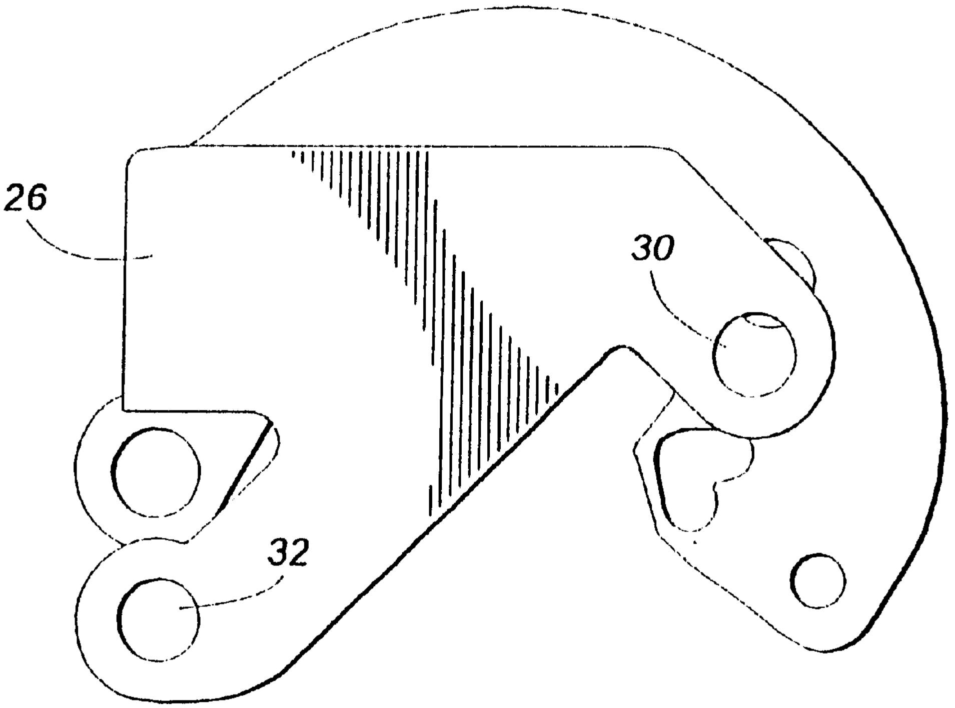
FIG. 3 is a side elevation of the throttle lever adapter with the Holley bracket attached.

FIG. 3 shows the device with the Holley attachment 26. The Holley attachment is used with Holley carburetors. In the preferred embodiment, the device is equipped with a Holley attachment which may be removed by users of Edelbrock or Carter carburetors, so as to maintain the universality of the device. The Holley attachment may be easily sawed away with a hacksaw if not required. However, most Holley carburetors were fitted to Chrysler cars on an aftermarket basis. Therefore, most Chrysler cars will use the device without the Holley adapter. Void 30 is used to mount the throttle lever adapter to the Holly throttle lever, and void 32 is used to mount the throttle cable to the throttle lever adapter.

What is claimed is:

1. A linkage which universally mounts to rear wheel drive and carbureted automobiles manufactured by the CHRYSLER CORPORATION from the period 1962 to the date of the filing of this application for patent, for linking, by cable, a carburetor throttle lever to a transmission of a rear wheel drive and carbureted automobile manufactured by the CHRYSLER CORPORATION from the period 1962 to the date of the filing of this application, comprising a throttle lever adapter, wherein said throttle lever adapter comprises, in turn, a generally vertical portion and an arm which extends aftwardly from an upper surface of said generally vertical portion, said arm having a dog leg which extends generally downwardly from a remainder of said arm, said throttle lever adapter having an arcuate and mammillated forward and upper surface which begins near a lower end of said generally vertical portion and extends to near an end of said arm which is opposite said generally vertical portion, and above said dog leg, wherein a throttle lever mounting is located in said generally vertical portion, and a transmission cable mounting is located in said dog leg of said arm and opposite said generally vertical portion, wherein said throttle lever adapter has a first notch on a lower surface of said generally vertical portion thereof, and said first notch is opposite said arcuate and mammillated surface, and wherein said throttle lever adapter has a second notch which is present substantially where said arm joins said generally vertical portion of said throttle lever adapter, and said second notch is opposite said arcuate and mammillated surface.

2. A linkage which universally mounts to rear wheel drive and carbureted automobiles manufactured by the CHRYSLER CORPORATION from the period 1962 to the date of the filing of this application for patent, for linking, by cable, a carburetor throttle lever to a transmission of a rear wheel drive and carbureted automobile manufactured by the CHRYSLER CORPORATION from the period 1962 to the date of the filing of this application, comprising a throttle lever adapter, wherein said throttle lever adapter comprises, in turn, a generally vertical portion and an arm which extends aftwardly from an upper surface of said generally vertical portion, said arm having a dog leg which extends generally downwardly from a remainder of said arm, said throttle lever adapter having an arcuate and mammillated forward and upper surface which begins near a lower end of said generally vertical portion and extends to near an end of said arm which is opposite said generally vertical portion, and above said dog leg, wherein a throttle lever mounting is located in said generally vertical portion, and a transmission cable mounting is located in said dog leg of said arm and opposite said generally vertical portion, wherein said generally vertical portion further comprises a secondary throttle lever mounting in the form of an eccentric void which is positioned below said throttle lever mounting.

3. A linkage which universally mounts to rear wheel drive and carbureted automobiles manufactured by the CHRYSLER CORPORATION from the period 1962 to the date of the filing of this application for patent, for linking, by cable, a carburetor throttle lever to a transmission of a rear wheel drive and carbureted automobile manufactured by the CHRYSLER CORPORATION from the period 1962 to the date of the filing of this application, comprising a throttle lever adapter, wherein said throttle lever adapter comprises a generally vertical portion and an arm which extends aftwardly from said generally vertical portion, wherein said throttle lever adapter has a first notch on a lower surface thereof, and wherein said throttle lever adapter has a second notch which is present substantially on a lower surface of said throttle level adapter where said arm joins said generally vertical portion of said throttle lever adapter.

4. A linkage which universally mounts to rear wheel drive and carbureted automobiles manufactured by the CHRYSLER CORPORATION from the period 1962 to the date of the filing of this application for patent, for linking, by cable, a carburetor throttle lever to a transmission of a rear wheel drive and carbureted automobile manufactured by the CHRYSLER CORPORATION from the period 1962 to the date of the filing of this application, comprising a throttle lever adapter, wherein said throttle lever adapter comprises a generally vertical portion and an arm which extends aftwardly from said generally vertical portion, and wherein a throttle lever mounting is located in said generally vertical portion, and a transmission cable mounting is located in said arm and opposite said generally vertical portion, and wherein said generally vertical portion further comprises a secondary throttle lever mounting in the form of an eccentric void which is positioned below said throttle lever mounting.

* * * * *